US007633769B2

(12) United States Patent
Toda et al.

(10) Patent No.: US 7,633,769 B2
(45) Date of Patent: *Dec. 15, 2009

(54) DC-AC CONVERTER, AND METHOD FOR SUPPLYING AC POWER

(75) Inventors: Hiroki Toda, Ichinomiya (JP); Kenichi Fukumoto, Kyoto (JP); Yosuke Aoyagi, Kyoto (JP); Hiroyuki Fujita, Kyoto (JP)

(73) Assignee: Rohm Co., Ltd., Kyoto-shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/772,602

(22) Filed: Jul. 2, 2007

(65) Prior Publication Data

US 2007/0279946 A1 Dec. 6, 2007

Related U.S. Application Data

(63) Continuation of application No. 11/521,418, filed on Sep. 13, 2006, now Pat. No. 7,248,488, which is a continuation of application No. 11/340,396, filed on Jan. 26, 2006, now Pat. No. 7,126,831, which is a continuation of application No. 10/806,262, filed on Mar. 22, 2004, now Pat. No. 7,046,526.

(30) Foreign Application Priority Data

May 23, 2003 (JP) .............................. 2003-146060

(51) Int. Cl.
*H02M 3/335* (2006.01)
*H02H 7/122* (2006.01)
*H02M 7/538* (2007.01)

(52) U.S. Cl. ...................... 363/26; 363/56.06; 363/133; 363/24

(58) Field of Classification Search .................. 363/26, 363/56.06, 133, 24, 134
See application file for complete search history.

(56) References Cited

U.S. PATENT DOCUMENTS

| 5,371,666 A | 12/1994 | Miller |
| 5,708,571 A | 1/1998 | Shinada |
| 5,767,744 A | 6/1998 | Irwin et al. |
| 5,852,555 A | 12/1998 | Martin |
| 5,896,280 A | 4/1999 | Gucyski et al. |

(Continued)

FOREIGN PATENT DOCUMENTS

JP 6-14556 1/1994

(Continued)

*Primary Examiner*—Bao Q Vu
(74) *Attorney, Agent, or Firm*—Merchant & Gould P.C.

(57) ABSTRACT

First and second semiconductor switches which are activated alternately are provided between ends of a primary winding and a common potential point, wherein a DC power supply voltage is supplied to a center tap. An electric current flowing into a load is fed back to thereby subject the semiconductor switches to PWM control. Series circuits consisting of capacitors and semiconductor switches are connected between the center tap of the primary winding and the ends of the same. The semiconductor switches are activated in synchronism with the first and second semiconductor switches, thereby preventing occurrence of an anomalous high voltage, which would otherwise be caused at the time of switching operation.

5 Claims, 9 Drawing Sheets

U.S. PATENT DOCUMENTS

| | | |
|---|---|---|
| 6,301,139 B1 | 10/2001 | Patel |
| 6,330,169 B2 | 12/2001 | Mullett et al. |
| 6,483,731 B1 | 11/2002 | Isurin et al. |
| 6,504,735 B2 | 1/2003 | Negru et al. |

FOREIGN PATENT DOCUMENTS

| | | |
|---|---|---|
| JP | 7-46840 | 2/1995 |
| WO | WO 99/34651 | 7/1999 |

DC-AC CONVERTER, AND METHOD FOR SUPPLYING AC POWER

This application is a Continuation of application Ser. No. 11/521,418 filed Sep. 13, 2006 which is a Continuation of Ser. No. 11/340,396, filed Jan. 26, 2006, which is a Continuation of Ser. No. 10/806,262 filed Mar. 22, 2004, which applications are incorporated herein by reference.

BACKGROUND OF THE INVENTION

1. Field of the Invention

The invention relates to a DC-AC converter (hereinafter referred to as an "inverter") for producing an AC voltage to be used for driving a load from a DC power source such as a mains adapter, which is an accessory of an electrical appliance, or a battery, as well as to an AC power supply method.

2. Description of the Related Art

A cold cathode fluorescent lamp (CCFL) has come into use as a back light source for a liquid-crystal monitor of a notebook PC or a liquid-crystal display of a liquid-crystal TV receiver and so on. In general, the CCFL might be of higher efficiency and longer life use than those of an ordinary hot cathode fluorescent lamp. A filament usually provided in the hot cathode fluorescent lamp is omitted from the CCFL.

Start-up and activation of the CCFL require a high AC voltage. For instance, a start-up voltage is about 1,000 volts, and an operating voltage of the CCFL is about 600 volts. Such a high AC voltage is produced from a DC power source of a laptop computer or a liquid-crystal TV receiver through use of an inverter.

In conventional arts, Royer circuit has been known for an inverter use of a CCFL. The Royer circuit is formed from a saturable magnetic core transformer, a control transistor, and other circuit elements. The Royer circuit can perform a self-oscillation by means of non-linear permeability of the saturable magnetic core transformer and a non-linear current gain characteristic of the control transistor. However, the Royer circuit itself does not need any external clock or driver circuit.

The Royer circuit is basically a constant-voltage inverter. Therefore, when fluctuation arises in an input voltage or a load current, the Royer circuit cannot maintain a constant output voltage. Consequently, a regulator is required for supplying the power to the Royer circuit. In this regard, it was difficult for an inverter using the Royer circuit to be down-sized and achieve a efficient low power conversion.

Among other related arts, there has been proposed an inverter using a center-tap-type transformer, in which the transformer has a primary winding which supplies a DC voltage to a center tap, and a secondary winding for outputting an AC voltage such as disclosed in the International Patent Publications of No. WO 99/34651 or Japanese Patent Publication Hei 6-14556.

An inverter disclosed in WO 99/34651 has a center tap of the primary winding provided with a DC voltage, and semiconductor switches provided between respective ends of the primary winding and the ground so that the semiconductor switches are alternately operated in On-state and Off-state. Further, the inverter is provided with a PWM controller for performing a PWM control so as to supply DC voltage to the inverter. The power supplied from the inverter to the load can be controlled by means of said DC current control performed by the PWM controller.

An inverter of the JP Hei 6-14556 comprises a primary winding having a DC power source connected to a center tap; a secondary winding for outputting an AC voltage; a booster transformer having a tertiary winding for feedback purpose; a resonance capacitor connected between both ends of the primary winding of the booster transformer to constitute an LC resonance circuit between the capacitor and the inductance of the primary winding; a pair of semiconductor switches, one end of each semiconductor switch being connected to the other end of the resonance capacitor, the remaining end of each semiconductor switch being connected to the earth, and the semiconductor switches being alternately operated On-Off states in accordance with a voltage output from the tertiary winding; and a variable inductance connected to the inside of an LC resonance circuit. The voltage output from the inverter is controlled by means of controlling the inductance of the variable inductor.

The inverter using the conventional Royer circuit has difficulty to be down-sized and suffers a problem of low conversion efficiency. The inverter of WO 99/34651 additionally requires a PWM controller for performing the PWM control so as to supply DC voltage to the inverter, of which overall structure of the DC-AC converter ends up being complicated, and difficulty still remains in its down-sizing. As for the inverter of JP Hei 6-14556, since it has a variable inductor connected to the inside of the LC resonance circuit such that an output voltage can be controlled by controlling the inductance of the inductor, the structure of the inverter becomes complicated and difficulty of down-sizing is still unresolved.

SUMMARY OF THE INVENTION

It is an objects of this invention to provide an inverter for producing AC voltage from the DC power source to be used for driving a load with a simple configuration with a fine control of the power supply to the load by using a transformer having a primary winding with a center tap to which DC voltage is supplied.

An inverter of the first aspect in this invention is characterized by comprising: a transformer having a primary winding with a center tap, and at least one secondary winding, in which the center tap is connected to a first potential point of a DC power source; a first semiconductor switch which is connected between one end of the primary winding and a second potential point of the DC power source and causes an electric current to flow through the primary winding in a first direction; a second semiconductor switch which is connected between the other end of the primary winding and the second potential point and causes an electric current to flow through the primary winding in a second direction; a first capacitor and a third semiconductor switch, which are connected in series between the other end of the primary winding and the center tap; a second capacitor and a fourth semiconductor switch, which are connected in series between the one end of the primary winding and the center tap; a current detection circuit to be used for detecting an electric current which flows into a load connected to the secondary winding; a pulse width modulation circuit which produces a pulse width modulation signal by comparing a feedback signal formed on the basis of an electric current detected by the current detection circuit with a triangular wave signal train; and a logic circuit to be used for outputting a switch drive signal and which produces, on the basis of the pulse width modulation signal, a first switch drive signal to be used for turning on the first semiconductor switch, a second switch drive signal to be used for turning on the second semiconductor switch, a third switch drive signal to be used for turning on the third semiconductor switch, and a fourth switch drive signal to be used for turning on the fourth semiconductor switch, wherein the first through fourth switch drive signals are produced at timings of an off-state period where the first through fourth semiconductor switches are turned off, said timings being produced during interval periods such that a first semiconductor switch group, comprising the first semiconductor switch and the third semiconductor switch, and a second semiconductor switch group, comprising the second semiconductor switch and the fourth semiconductor switch, are alternately made on-state synchronously with triangular wave signals of the triangular wave signal train.

An inverter of the second aspect in this invention is characterized in that the first and third semiconductor switches are turned on at every other peak of the triangular wave signal of the triangular wave signal train and remain on-sate until an immediately-subsequent triangular wave signal becomes equal to the feedback signal; and further wherein the second and fourth semiconductor switches are turned on at every other peak of the triangular wave signal of the triangular wave signal train, which is different from that of being generated when the first and third semiconductor switches are turned on, and remain on-state until an immediately-subsequent triangular wave signal becomes equal to the feedback signal.

An inverter of the third aspect in this invention is characterized in that the first semiconductor switch is turned on at every other peak of the triangular wave signal of the triangular wave signal train and remains on-state until an immediately-subsequent triangular wave signal becomes equal to the feedback signal; the second semiconductor switch is turned on at every other peak of the triangular wave signal of the triangular wave signal train, which is different from that of being generated when the first semiconductor switch is turned on, and remains on-state until an immediately-subsequent triangular wave signal becomes equal to the feedback signal; the third semiconductor switch is turned on at a timing before the first semiconductor switch is turned on, but after lapse of a predetermined period of time since the second semiconductor switch completes the on-sate period thereof and remains on-state during a period in which the first semiconductor switch remains on-state; and the fourth semiconductor switch is turned-on at a timing before the second semiconductor switch is turned on, but after lapse of a predetermined period of time since the first semiconductor switch completes the on-state period thereof and remains on-state during a period in which the second semiconductor switch remains on-state.

An inverter of the fourth aspect in this invention is characterized in that the first through fourth semiconductor switches are MOS field-effect transistors.

The fifth aspect in this invention is characterized in that a burst control signal in the form of a pulse train, which allows a ratio of on-state period and off-state period to be controlled, whereby the first through fourth switch drive signals can be produced or stopped.

The sixth aspect in this invention is characterized in that a power supply voltage of a DC power source is converted, to a load connected to a secondary winding of a transformer, the transformer having a primary winding with a center tap, and at least one secondary winding, the method comprising the operations of: connecting the center tap to a first potential point of the DC power source; connecting a first semiconductor switch for causing an electric current to flow through the primary winding in a first direction between one end of the primary winding and a second potential point of the DC power source; connecting a second semiconductor switch for causing an electric current to flow through the primary winding in a second direction between the other end of the primary winding and the second potential point of the DC power source;

connecting a first capacitor and a third semiconductor switch in series between the other end of the primary winding and the center tap; connecting a second capacitor and a fourth semiconductor switch in series between the one end of the primary winding and the center tap; detecting an electric current flowing through the load connected to the secondary winding by means of a current detection circuit;

producing a feedback signal on the basis of the electric current detected by the current detection circuit and comparing the feedback signal with a triangular wave signal train, thereby producing a pulse width modulation signal; and producing, on the basis of the pulse width modulation signal, a first switch drive signal to be used for turning on the first semiconductor switch, a second switch drive signal to be used for turning on the second semiconductor switch, a third switch drive signal to be used for turning on the third semiconductor switch, and a fourth switch drive signal to be used for turning on the fourth semiconductor switch; whereby producing the first through fourth switch drive signals at timings of an off-state period where the first through fourth semiconductor switches are turned off, said timings being produced during interval periods such that a first semiconductor switch group, comprising the first semiconductor switch and the third semiconductor switch, and a second semiconductor switch group, comprising the second semiconductor switch and the fourth semiconductor switch, are alternately made on-sate synchronously with triangular wave signals of the triangular wave signal train.

DESCRIPTION OF THE PREFERRED EMBODIMENTS

By reference to the drawings, there will be described a mode for realizing an inverter which produces, from a DC power source, an AC voltage to be used for driving a load and implementing an AC power supply method, both pertaining to the invention.

Figure 1:
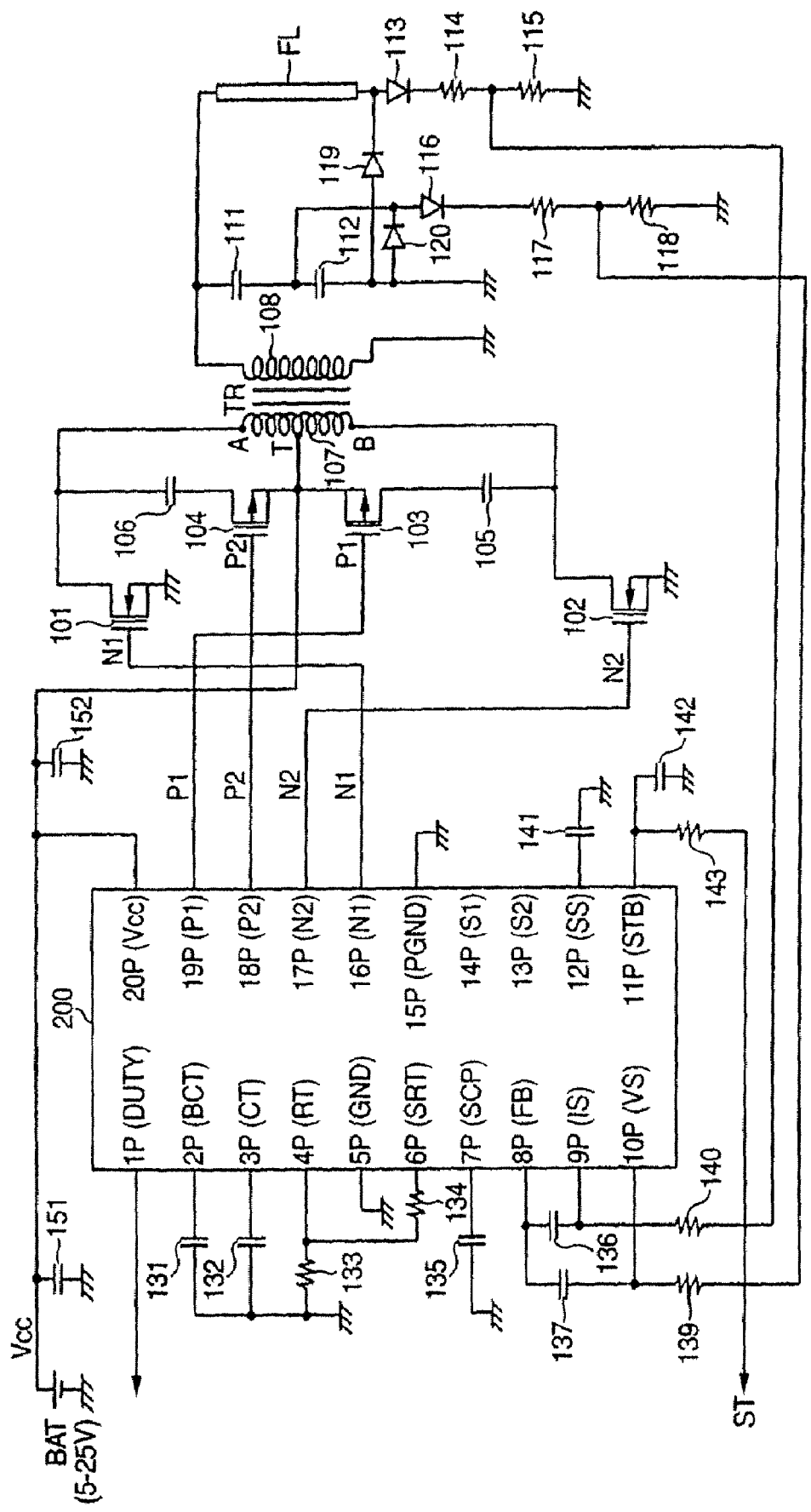
FIG. 1 is an overall block diagram of an inverter according to a first embodiment of the invention.
Figure 2:
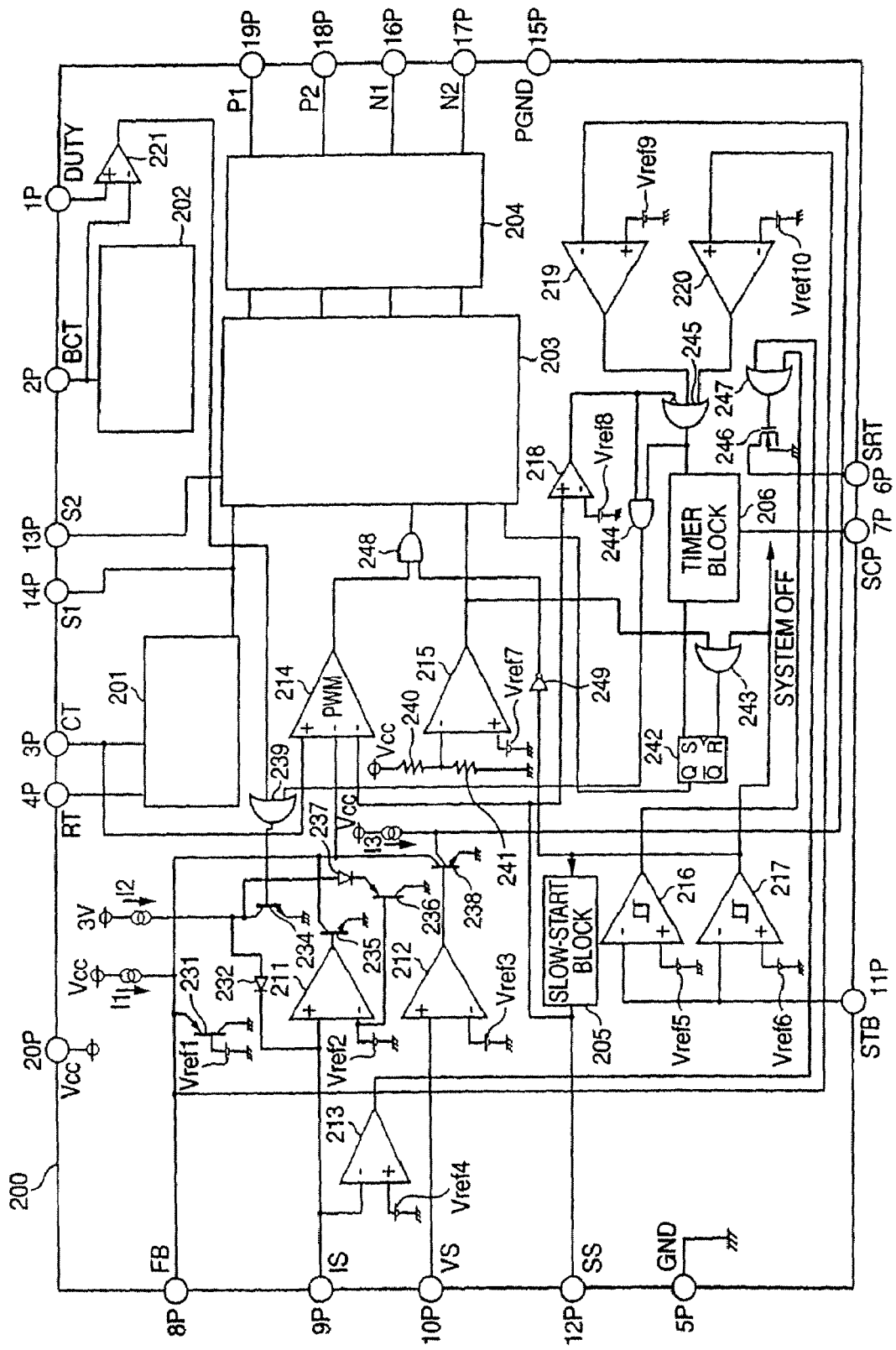
FIG. 2 is an internal block diagram of an inverter control IC for use in FIG. 1.

FIG. 1 is a view showing the entire configuration of an inverter of the embodiment of the invention which performs PWM control operation through use of an insulating transformer having a primary winding with a center tap and a secondary winding and through use of semiconductor switching circuits. FIG. 2 is a view showing the internal configuration of an IC for controlling the inverter.

In FIG. 1, a transformer TR is an insulating transformer having a primary winding 107 and a secondary winding 108 for supplying AC power to a load, wherein the primary winding 107 has a center tap T, one terminal A (hereinafter called a "first terminal"), and the other terminal B (hereinafter called a "second terminal"). A DC supply voltage VCC, being supplied from a battery power source BAT, is supplied to the center tap T of the transformer TR where said VCC is a voltage from the ground which is serving as a common potential point.

An n-type MOSFET (hereinafter abbreviated "NMOS") 101 serving as a first semiconductor switch is a switch to be used for forming a current path in a first direction on the primary winding 107 of the transformer TR. On the other hand, NMOS 102 serving as a second semiconductor switch is a switch to be used for forming a current path in a second direction on the primary winding 107 of the transformer TR. Thus the NMOS 101 and the NMOS 102 are alternately activated, which generate an alternating current to flow into the primary winding 107 of the transformer TR.

A DC circuit, which consists of a first capacitor 105 and a p-type MOSFET (hereinafter abbreviated "PMOS") 103 serving as a third semiconductor switch, is connected between the center tap T of the primary winding 107 and the second terminal B. The PMOS 103 is basically controlled so as to be turning on synchronously to the NMOS 101. In the same manner, DC circuit, which consists of a second capacitor 106 and a PMOS 104 serving as a fourth semiconductor switch, is connected between the center tap T of the primary winding 107 and the first terminal A. The PMOS 104 is basically controlled to be turning on synchronously with the NMOS 102.

The NMOS 101, the NMOS 102, the PMOS 103, and the PMOS 104 each have a body diode (i.e., a backgate diode). The body diode enables flow of an electric current in a reverse direction of that of the original current path. A diode having the same functional characteristics as that of the body diode might be optionally provided.

The power supply voltage VCC of the DC power supply BAT is supplied to the primary winding 107 of the transformer TR by way of the NMOS 101 and the NMOS 102. Therefore a high voltage proportional to a winding ratio of the secondary winding 108 is induced. This induced high voltage is supplied to a cold cathode fluorescent lamp FL, serving as load, so as to turn on the lamp. The PMOS 103 and the PMOS 104 as well as the capacitors 105, 106 are functioning as suppressing occurrence of an anomalous peak over voltage, or recovering the flyback energy.

Capacitors 111 and 112 as well as resistors 117 and 118 detect a voltage to be applied to the cold cathode fluorescent lamp FL. The thus-detected voltage is fed back to a controller IC 200. Resistors 114, 115 detect the electric current flowing through the cold cathode fluorescent lamp FL, and the thus-detected electric current is fed back to the controller IC 200. The capacitor 111 is used for oscillation by its capacitance factor and the inductance factor of the transformer TR. Parasitic capacitance of the cold cathode fluorescent lamp FL might be also contributing to said oscillation. As for the reference numerals 113, 116, 119, and 120, they denote diodes while the reference numerals 151, 152 denote capacitors for stabilizing a power supply voltage.

The controller IC 200 has a plurality of input and output pins. The first pin 1P is a changeover terminal for switching between a PWM mode and an intermittent mode (hereinafter called a "burst") mode. Input from the outside to the first pin 1p is a duty signal DUTY to be used for switching the modes and determining the duty ratio of the burst mode. A second pin 2P is a connector terminal to which a capacitance for setting an oscillation frequency of a burst mode oscillator (BOSC) might be connected. A capacitor 131 for setting purpose is connected to the second pin 2P, so that a triangular wave signal BCT for bursting purpose is generated at the second pin 2p.

A third pin 3P is a terminal connector to which a capacitance to be used for setting an oscillation frequency of a PWM mode oscillator (OSC) is connected. In this embodiment, a setting capacitor 132 is connected to the third pin 3P so that a triangular wave signal CT for PWM use is developed at the third pin 3P. A fourth pin 4P is a terminal connector to which a resistor for setting an electric current to be used for recharging the third pin 3P is connected. In this case, a setting resistor 133 is connected to the fourth pin 4P so that electric current, corresponding to an electric potential RT and the resistance value of the resistor—, flows through the fourth pin 4P. A fifth pin 5P is a ground terminal and remains at a ground potential GND.

A sixth pin 6P is a connector terminal to which a resistor for setting an electric current to be used for recharging the third pin 3P is connected. In this embodiment, a setting resistor 134 is connected to the sixth pin 6P where a control operation of an internal circuit enables the resistor 134 to be connected in parallel to the setting resistor 133 or disconnected therefromby means of. A potential SRT of the sixth pin 6P becomes either a ground potential GND or a potential RT of the fourth pin 4P. A seventh pin 7P is a connector terminal to which a timer latch setting capacitance is connected such that a capacitor 135 to be used for setting an operating time limit for internal circuit protection is connected to the seventh pin 7P so that a potential SCP corresponding to electric charge of the capacitor 135 is operated.

A current detection signal (hereinafter a "detection current") IS corresponds to the electric current flowing into the cold cathode fluorescent lamp FL is input to a ninth pin 9P by way of a resistor 140 so that the current detection signal IS is input to a first error amplifier. An eighth pin 8P is a first error amplifier output terminal. A capacitor 136 is connected between the eighth pin 8P and a ninth pin 9P. The potential of the eighth pin 8P is functioning as a feedback voltage FB and serves as a control voltage for PWM control purpose. Unless otherwise specified, voltages will be hereinbelow determined with reference to a ground potential.

A voltage detection signal (hereinafter called a "detection voltage") VS corresponding to a voltage applied to the cold cathode fluorescent lamp FL is input to a tenth pin 10P by way of a resistor 139 and delivered to a second error amplifier. A capacitor 137 is connected between the tenth pin 10P and the eighth pin 8P.

An eleventh pin 11P is a terminal to be used for activation and setting a start-up time. Applied to the eleventh pin 11P is a signal STB produced by means of delaying a start-up signal ST and subjecting the thus-delayed signal to noise suppression through use of a resistor 143 and a capacitor 142. A twelfth pin 12P is a terminal used for connecting a capacitance for setting a slow start. Further, a capacitor 141 is connected between the twelfth pin 12P and the ground. A slow start voltage SS which gradually increases at the time of startup develops in the twelfth pin 12P.

A thirteenth pin 13P is a connector terminal for synchronization purpose. When the controller IC 200 is operated in conjunction with another controller IC such as use in a system LSI, the thirteenth pin 13P is connected to that controller IC.

A fourteenth pin 14P is an internal clock input/output terminal where the controller IC 200 is operated in conjunction with another IC such as use in a system LSI, the fourteenth pin 14P is connected to that controller IC.

A fifteenth pin 15P is a ground terminal of an external FET drive circuit. A sixteenth pin 16P is a terminal to be used for outputting a gate drive signal N1 of the NMOS 102. A seventeenth pin 17P is a terminal to be used for outputting a gate drive signal N2 of the NMOS 104. An eighteenth pin 18P is a terminal to be used for outputting a gate drive signal P2 of the PMOS 103. A nineteenth pin 19P is a terminal to be used for outputting a gate drive signal P1 of the PMOS 101. A twentieth pin 20P is a power terminal into which a power supply voltage VCC is input.

In FIG. 2, which shows the internal configuration of the controller IC 200, an OSC block 201 produces the PWM triangular wave signal CT determined by means of the capacitor 132 connected to the third pin 3P and the resistors 133, 134 connected to the fourth pin 4P. The PWM triangular wave signal CT is supplied to a PWM comparator 214. Further, the OSC block 201 produces an internal clock signal and supplies the thus-produced clock signal to a logic block 203.

A BOSC block 202 is a circuit for oscillating a triangular wave signal for bursting purpose. The BOS block 202 produces the burst triangular wave signal BCT to be determined by the capacitor 131 connected to the second pin 2P. The BCT frequency is set to become considerably lower than a CT frequency (a BCT frequency<a CT frequency). The analog duty signal DUTY (a DC voltage) supplied to the first pin 1P is compared with the triangular wave signal BCT by means of a comparator 221. An n-p-n transistor (hereinafter abbreviated simply as "NPN") 234 is activated by means of such a comparison output by way of an OR circuit 239. When the digital duty signal DUTY (of PWM format) is supplied to the first pin 1P, a resistor is connected to the second pin 2P, thereby causing the BOSC block 202 to produce a predetermined burst voltage.

A PWM control signal or the like is input to the logic block 203, and a switch drive signal is produced in accordance with a predetermined logic. Gate drive signals P1, P2, N1, and N2 are applied to gates of the PMOSs 101, 103 and gates of the NMOSs 102, 104 by way of the output block 204.

The start-up signal ST is input to a slow start block 205. When an input to a comparator 217; that is, the voltage STB which is gradually boosted by the capacitor 142 and the resistor 143, has exceeded the reference voltage Vref 6, the slow start block 205 is activated by an output from the comparator 217. The output from the comparator 217 enables driving of the logic block 203. Here, reference numeral 249 designates an inverting circuit. Further, a flip-flop (FF) circuit 242 is reset by means of the output from the comparator 217 by way of an OR circuit 243. When the start block 205 is activated, the slow start voltage SS gradually increases. The slow start voltage SS is input to the PWM comparator 214 as a comparison input. Consequently, at the time of start-up, the PWM control is performed in accordance with the slow start voltage SS.

When the input has exceeded the reference voltage Vref 5 at the time of start-up, the comparator 216 turns off an NMOS 246 by way of an OR circuit 247. As a result, the resistor 134 is disconnected, thereby changing the frequency of the PWM triangular wave signal CT. An output from the comparator 213 is also input to the OR circuit 247.

The detection current IS proportional to the electric current of the cold cathode fluorescent lamp FL is input to a first error amplifier 211. The detection current IS is compared with the reference voltage Vref 2 (e.g., 1.25 volts). By means of an output corresponding to the error, an NPN 235 connected to a constant current source I1 is controlled. A collector of the NPN 235 is connected to the eighth pin 8P. The potential of the node is taken as a feedback voltage FB and input to the PWM comparator 214 as a comparison input.

The PWM comparator 214 compares the triangular wave signal CT with the feedback voltage FB or the slow start voltage SS, whichever voltage is lower, thereby producing the PWM control signal. The thus-produced PWM control signal is supplied to the logic block 203 by way of an AND circuit 248. In a stationary state achieved after end of start-up operation, the triangular wave signal CT is compared with the feedback voltage FB. A set electric current is automatically controlled so as to flow into the cold cathode fluorescent lamp FL.

The capacitor 136 is connected between the eighth pin 8P and the ninth pin 9P, and the feedback voltage FB smoothly increases or decreases. Consequently, PWM control operation is smoothly performed without occurrence of shock.

The detection voltage VS proportional to the voltage of the cold cathode fluorescent lamp FL is input to a second error amplifier 212 and compared with a reference voltage Vref 3 (e.g., 1.25 volts). By means of a resultant output corresponding to the error, an NPN 238 of a double collector structure whose one collector is connected to the constant current source I1 is controlled. The collector of the NPN 238 is also connected to the eighth pin 8P. Hence, the feedback voltage FB is also controlled by means of the detection voltage VS. When the feedback voltage FB has exceeded the reference voltage Vref1 (e.g., 3 volts), a p-n-p transistor (hereinafter referred to simply as "PNP") 231 turns on, thereby limiting an excessive rise in the feedback voltage FB.

A comparator 215 compares a voltage into which the power supply voltage VCC has been divided by means of resistors 240, 241 with a reference voltage Vref 7 (e.g., 2.2 volts). At a point in time when the power supply voltage VCC has reached a predetermined value, the output is inverted, thus resetting the FF circuit 242 by way of the OR circuit 243.

A comparator 218 compares the slow start voltage SS with a reference voltage Vref 8 (e.g., 2.2. volts). When the voltage SS has become greater, the NPN 234 is activated by way of an AND circuit 244 and the OR circuit 239. As a result of the NPN 234 being turned on, the diode 232 is reversely biased by means of a current source I2. Consequently, standard operation of the first error amplifier 211 can be made.

When the NPN 238, whose remaining collector is connected to a constant current source I3, is turned on by means of the second error amplifier 212, the voltage of the comparator 219 becomes lower than a reference voltage Vref 9 (e.g., 3.0 volts), and a comparison output from the comparator 219 is inverted. A comparator 220 compares the feedback voltage FB with a reference voltage Vref 10 (e.g., 3.0 volts) so that in case of the feedback voltage FB coming to be higher, a comparison output is inverted. The inverted signals output from the comparator 219 and the comparator 220 and the signal output from the comparator 218 are applied to a timer block 206 by way of an OR circuit 245. After a predetermined period of time has been connected, an output is produced by the timer block 206, whereby the FF circuit 242 is set, and operation of the logic block 203 is stopped by a Q output from the FF circuit 242.

Operation of the inverter having the foregoing configuration will now be described in connection with PWM control and burst control.

During a period in which the duty signal DUTY has exceeded the burst triangular wave signal BCT (i.e., an ON-DUTY period), PWM control is performed. On the other hand, during a period in which the duty signal DUTY is lower than the burst triangular wave signal BCT (i.e., an OFF-DUTY period), PWM control is halted, and power supply to the cold cathode fluorescent lamp FL is suspended.

Assuming that the frequency of the PWM triangular wave signal CT assumes is 50 kHz, and the PWM triangular wave signal CT is subjected to burst control performed by the triangular wave signal BCT of, e.g., 150 Hz, this might not cause any visual problem. Moreover, by means of controlling the magnitude of the duty signal DUTY, control of the power supply, in other words, control of light amount, can be performed in the excess range more than where the power can be supplied to the cold cathode fluorescent lamp FL by relying on only PWM control.

As for a specific circuit operation which is performed during a period in which the duty signal DUTY is below the burst triangular wave signal BCT, an output from the comparator 221 remains at a low (L) level and the NPN transistor 234 remains in off-state.

As a result, the diode 232 is forwardly biased by means of the constant current source I2 so that an input to the first error amplifier 211 becomes a high level, and the NPN transistor 235 becomes on-state, in which the feedback voltage FB is regulated to a low voltage.

The PWM comparator 214 compares a lower one of two negative input voltages with a positive triangular wave signal CT. In this case, the PWM control signal is not output.

Next, when the duty signal DUTY has surpassed the burst triangular wave signal BCT, the NPN transistor 234 becomes on-state, and the diode 232 is reversely biased to become off-state. At this time, since the detection voltage IS remains at a low level, the first error amplifier 211 produces an output corresponding to the input detection voltage IS so that controlling the conduction degree of the NPN transistor 235 can be controlled. The collector voltage of the NPN transistor 235, namely, the feedback voltage FB, gradually increases by means of operation of the capacitor 136 connected between the eighth and ninth pins, and reaches a stationary state corresponding to original feedback. As a result, the PWM control signal is supplied from the PWM comparator 214 to the logic block 203, whereby the gate drive signals P1 to N2 are output and the NMOSs 101, 102 are subjected to PWM control. Synchronously, the PMOSs 103, 104 can be controlled.

A logic used for producing the gate drive signals P1 to N2 in the logic block 203 and the output block 204 at the time of PWM control operation will now be described in detail by reference to the timing chart of a first example shown in FIG. 3 and operating states achieved at timings shown in FIG. 4. Operation of the invention will be described by reference to a waveform chart shown in FIG. 5.

On the basis of the pulse width modulation signal, namely, the PWM triangular wave signal CT and the feedback voltage FB, the output block 204 outputs a first gate drive signal N1 to be used for driving the NMOS 101 serving as the first semiconductor switch; a second gate drive signal N2 to be used for driving the NMOS 102 serving as the second semiconductor switch; a third gate drive signal P1 to be used for driving the PMOS 103 serving as the third semiconductor switch; and a fourth gate drive signal P2 to be used for driving the PMOS 104 serving as the fourth semiconductor switch.

The gate drive signals P1, P2, N1, and N2 are produced at the timings of an off-state period where all the NMOS 101, NMOS 102, the PMOS 103, and the PMOS 104 are turned off, said timings are produced during the interval periods such that a first semiconductor switch group, consisting of the NMOS 101 and the PMOS 103, and a second semiconductor switch group, consisting of the NMOS 102 and the PMOS 104, are alternately made on-state synchronously with triangular wave signals of the triangular wave signal train CT.

More specifically, the NOMS 101 and the PMOS 103 are turned on to the on-state at every other peak of the triangular wave signal of the triangular wave signal train of which peaks appear in a range lower than the feedback signal FB. These on-state NMOS 101 and the PMOS 103 continuously remain the state until the immediately-subsequent triangular wave signal becomes equal to the feedback signal FB. On the other hand, the NMOS 102 and the PMOS 104 are turned on at every other peak of the triangular wave signal of which peaks appearing the range lower than the feedback signal FB, but said peaks are different from the peaks at which the NMOS 101 and the PMOS 103 of the triangular wave signal train CT become on-states. The NMOS S102 and the PMOS 104 continuously remain activated until the immediately-subsequent triangular wave signal becomes equal to the feedback signal FB.

Figure 3:
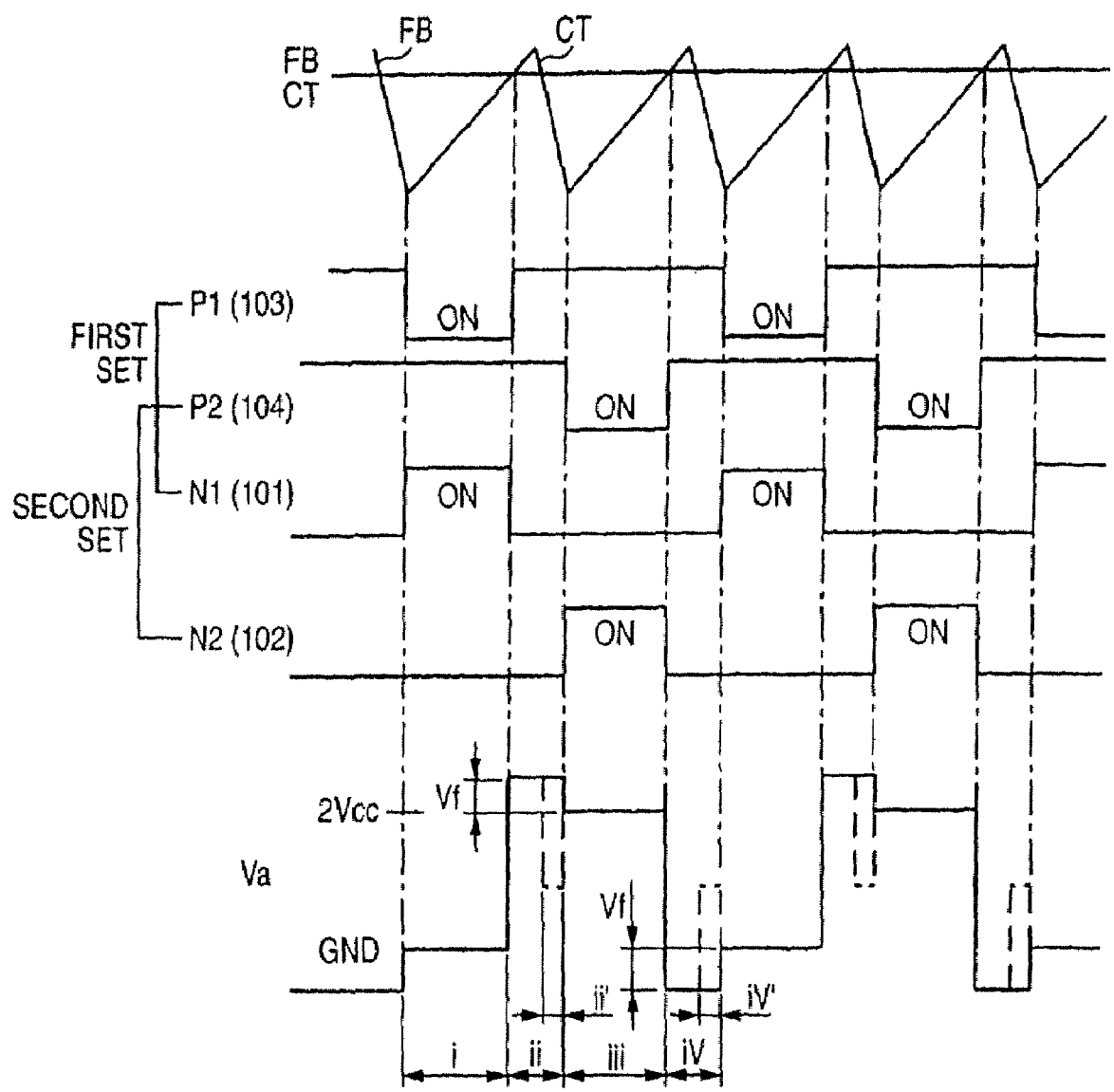
FIG. 3 is a timing chart of a first example of the inverter shown in FIG. 1.
Figure 4:
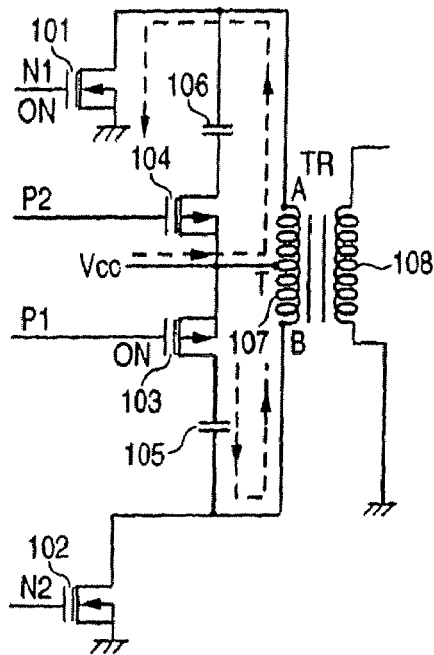
FIG. 4 is a view showing operating states of the inverter at timings shown in FIG. 3.
Figure 4:
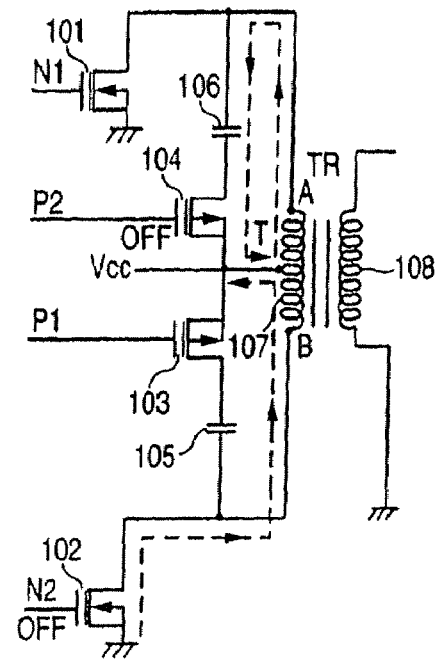
Figure 4:
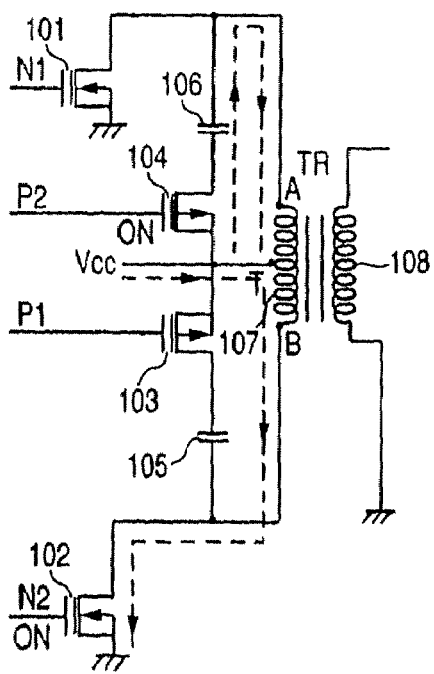
Figure 4:
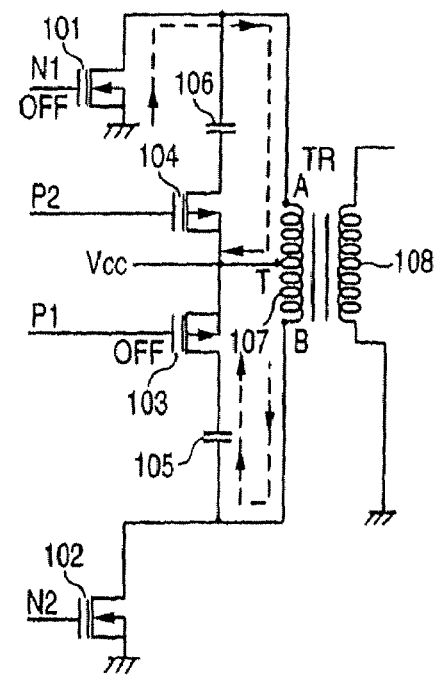

In a duration "i" shown in FIG. 3, the gate drive signal N1 is at a high level, and the NMOS 101 is on-state, and an electric current flows from the DC power source BAT (i.e., a power supply voltage VCC) to the primary winding 107 by way of the center tap T and the first terminal A in the first direction. This state is shown in FIG. 4A. The gate drive signal P1 remains at a low level, and the PMOS 103 becomes on-state. Consequently, a current loop is established from the center T with the other end terminal B (hereinafter called a second terminal) of the primary winding 107, the first capacitor C1, and the PMOS 103. An electric current flows in the direction illustrated by the arrows. Here, the voltage of the first terminal A (hereinafter called a voltage at point A) Va corresponds to the ground voltage GND.

During a duration ii, the gate drive signal N1 becomes low, and the gate drive signal P1 becomes high, whereupon the NMOS 101, the NMOS 102, the PMOS 103, and the PMOS 104 all become off-state. FIG. 4B shows this state. During the duration ii, the electric current running in the first direction flows into the DC power source BAT (i.e., the power supply voltage VCC) by way of the body diode of the NMOS 102, the second terminal B, and the center tap T, which is caused by the energy stored in the transformer TR. Similarly, the electric current flows through a current loop consisting of the second capacitor 106, the body diode of the PMOS 104, the center tap T, and the first terminal A, due to the energy stored in the transformer TR. In this state, the voltage Va obtained at the point A becomes a voltage defined by summation of a voltage drop Vf due to the body diode and twice of the power supply voltage VCC; that is, 2×VCC+Vf.

In a latter half the duration ii, when the electric current running in the first direction due to the energy stored in the transformer TR has become zero, the voltage Va obtained at the point A becomes the power supply voltage VCC as indicated by broken lines in a duration ii'. Such a state of the electric current of being zero might be produced when the duty factor of the pulse width modulation signal is made small. In other words, it might be produced when the on-state period of the gate drive signals P1, P2, N1, and N2 is short. In this case, the state in that the electric current flowing through the primary winding 107 becomes zero is realized before the direction of the electric current flowing through the primary winding 107 is switched.

In a duration iii, the gate drive signal N2 is high, and the NMOS 102 is on-state so that an electric current flows from the DC power source BAT (the power supply voltage VCC), to the primary winding 107 in the second direction by way of the center tap T and the second terminal B. FIG. 4C shows this state. The gate drive signal P2 remains at a low level, and the PMOS 104 becomes on-state. Hence, a current loop is formed so as to originate from the center tap T by way of the first terminal A of the primary winding 107, the second capacitor 106, and the PMOS 104, whereupon the electric current flows in the direction indicated by the arrows. The voltage Va obtained at the point A is twice the power supply voltage VCC (i.e., 2×VCC).

In a duration iv, the gate drive signal N2 becomes low, and the gate drive signal P2 becomes high where the NMOS 101, the NMOS 102, the PMOS 103, and the PMOS 104 all become inoperative. FIG. 4D shows this state. In the duration iv, the electric current running in the second direction flows into the DC power source BAT (i.e., the power supply voltage VCC) by way of the body diode of the NMOS 101, the first terminal A, and the center tap T which is caused by the energy stored in the transformer TR. Similarly, the electric current flows through a current loop consisting of the first capacitor 105, the body diode of the PMOS 103, the center tap T, and the second terminal B, due to the energy stored in the transformer TR. In this state, the voltage Va obtained at the point A becomes a voltage −Vf, which is lower than the ground voltage by an amount corresponding to the voltage drop Vf due to the body diode.

In a latter half of the duration ii, when the electric current, running in the second direction due the energy stored in the transformer TR, has become zero, the voltage Va obtained at the point A becomes the power supply voltage VCC as indicated by broken lines in a duration iv', as in the case of the duration ii'. The voltage obtained at point B of the second terminal B becomes reverse to the voltage Va obtained at point A during the durations "i" to iv.

Figure 5:
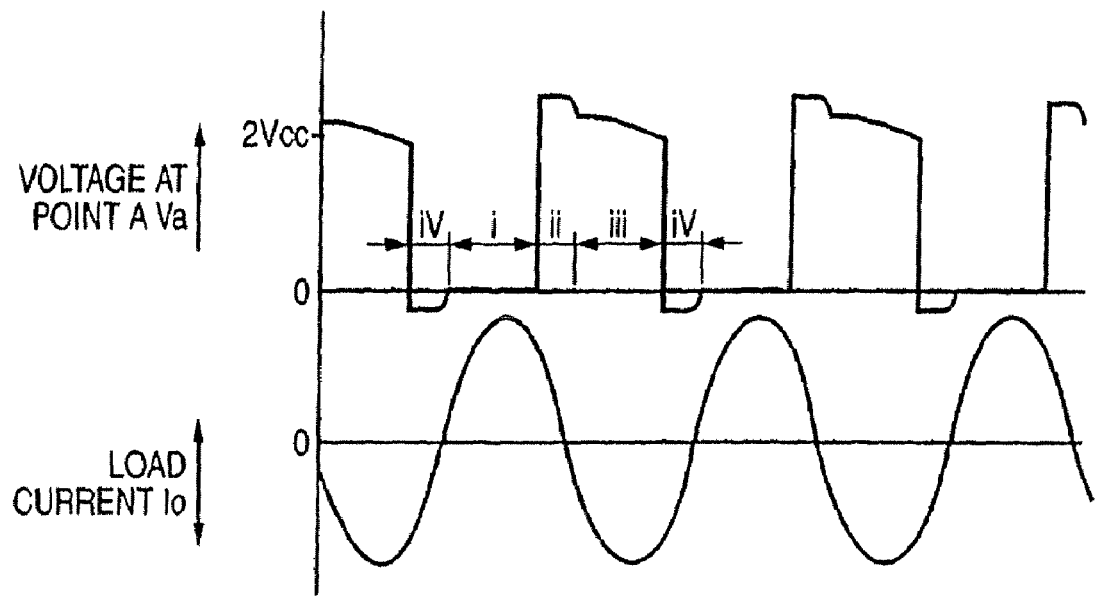
FIG. 5 is a waveform diagram for describing operation of the invention in comparison with a related-art inverter.
Figure 5:
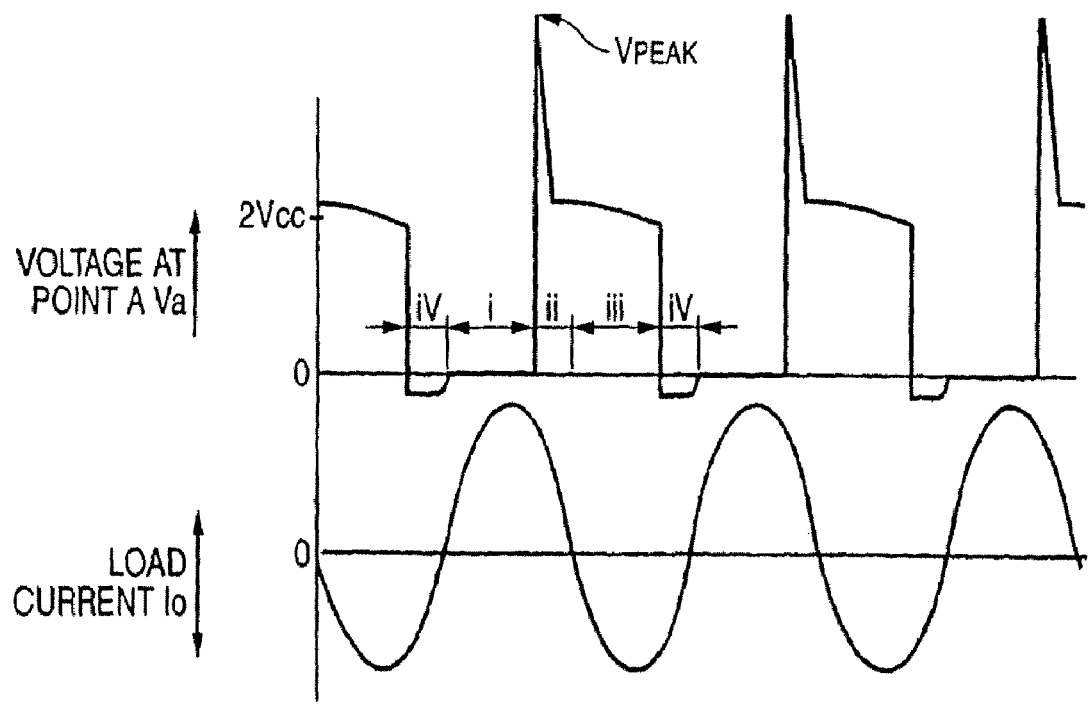

FIG. 5 shows a measured characteristic of the voltage Va obtained at the point A and a measured characteristic of the load current Io flowing into the cold cathode fluorescent lamp FL. FIG. 5A shows the voltage Va obtained at the point A and the load current Io of the first embodiment. FIG. 5B shows the voltage Va obtained at the point A and the load current Io, both being obtained when the circuit shown in FIG. 1 is not provided with a series circuit consisting of the PMOS 103 and the first capacitor 105 and a series circuit consisting of the PMOS 104 and the second capacitor 106.

In FIG. 5A, showing the characteristic of the invention, an upper limit of the voltage Va obtained at the point A is defined as a voltage obtained by adding the voltage drop Vf due to the body diode to double the power supply voltage VCC (2×VCC+Vf). In contrast, in the case of FIG. 5B, showing a characteristic obtained when the series circuits consisting of the PMOSs 103, 104 and the capacitors 105, 106 are not provided, an abnormal voltage Vpeak arises in the form of a very high spike in the voltage Va obtained at point A when the voltage has entered the duration ii. The abnormal voltage Vpeak is measured to be about five to six times the power supply voltage VCC.

When the abnormal voltage Vpeak arises, an element of high resistance design, which is capable of withstanding the abnormal voltage Vpeak, must be used. Further, the abnormal voltage Vpeak will act as a noise source for the surroundings.

According to the invention, the series circuits consisting of the PMOS 103, the PMOS 104, and the respective capacitors 105, 106 are provided between the center tap T of the primary winding 107 and the terminals, A, B. The PMOSs 103, 104 are turned on synchronously with the NMOSs 101, 102 with a predetermined relationship. Thus, fine adjustment of the power supply to the load can be made with a simple configuration. Occurrence of an abnormal high voltage, which would otherwise be caused at the time of switching, can be prevented, and an inverter can be configured with use of circuit elements of low withstand voltage. Recovery of flyback energy is also performed, so that a power conversion efficiency is also improved.

Figure 6:
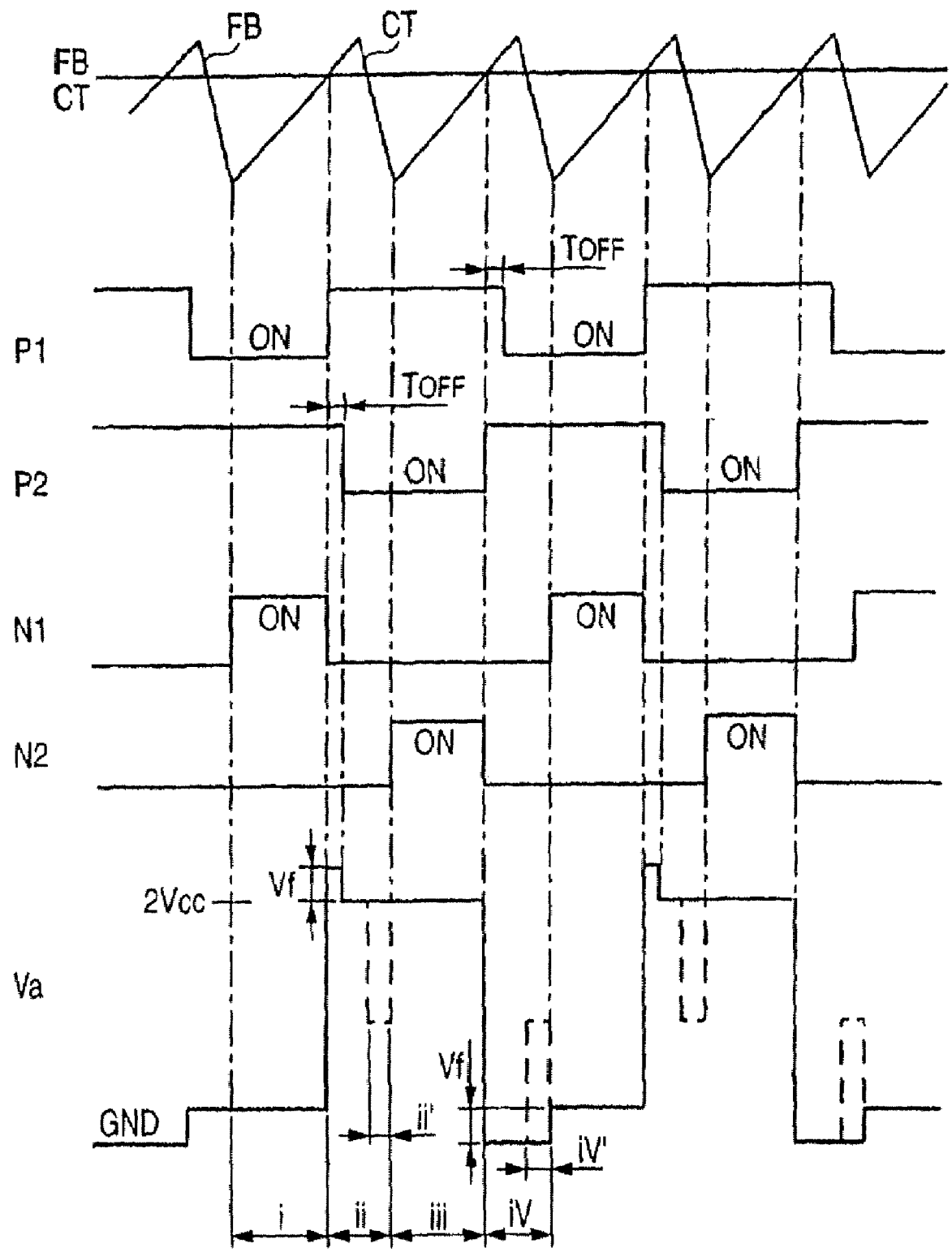
FIG. 6 is a timing chart of a second example of the inverter shown in FIG. 1.
Figure 7:
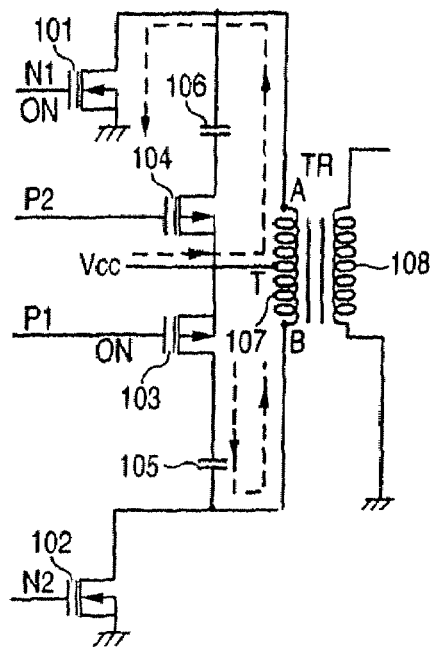
FIG. 7 is a view showing operating states of the inverter at timings shown in FIG. 6.
Figure 7:
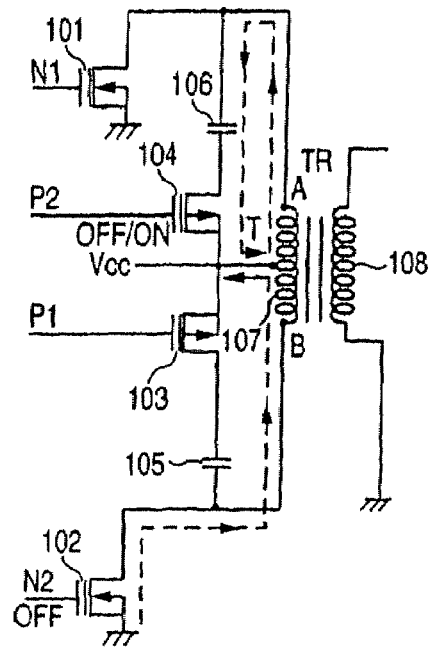
Figure 7:
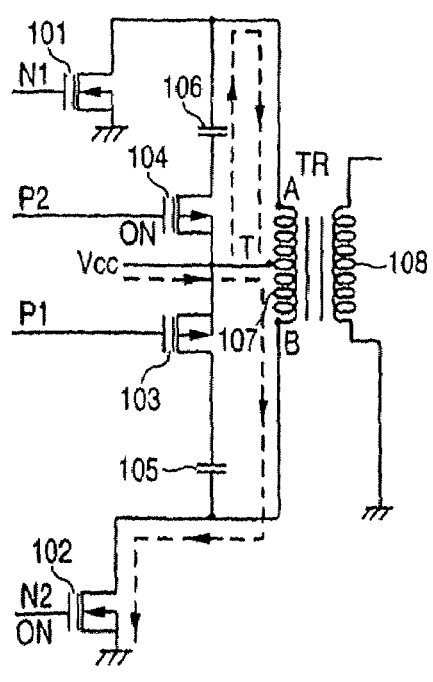
Figure 7:
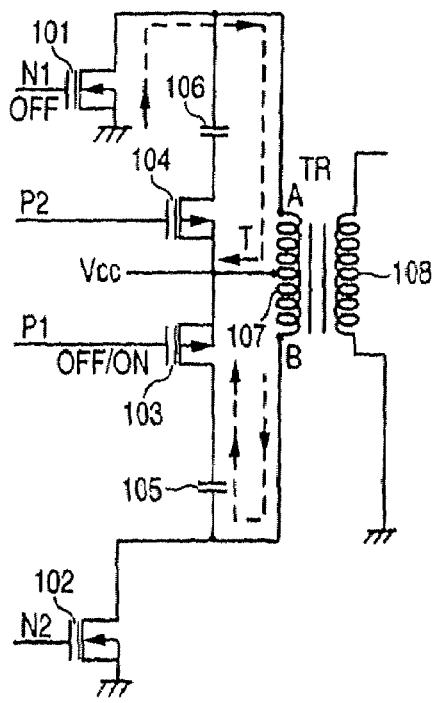

FIG. 6 is a timing chart of a second example for the inverter of the first embodiment shown in FIG. 1, wherein the on-state timings of the PMOSs 103, 104 are modified differently from those of the timing chart shown in FIG. 3. FIG. 7 is a view showing operating states of the inverter achieved at respective timings shown in FIG. 6.

FIG. 6 is similar to FIG. 3, except for the on-state timings of the PMOSs 103, 104, which are different from those shown in FIG. 3.

In FIG. 6, the NMOS 101 to be driven by the gate drive signal N1 is turned-on at every other peak point of the triangular wave signal of the triangular wave signal train CT. The NMOS 101 continues to be active until an immediately-subsequent triangular signal becomes equal to the feedback signal FB.

The NMOS 102 to be driven by the gate drive signal N2 is turned-on at every other peak point of the triangular wave signal of the triangular wave signal train CT, the peak points being differed from those of the triangular wave signal at which the NMOS 101 is turned-on. The NMOS 102 remains continuously on-state until an immediately-subsequent triangular signal becomes equal to the feedback signal FB.

The PMOS 103 is turned on faster than the NMOS 101 and after lapse of a predetermined time Toff since the NMOS 102 finished its on-state. The PMOS 103 remains active for a period during which the NMOS 101 is on-state.

The PMOS 104 is turned on faster than the NMOS 102 and after lapse of a predetermined time Toff since the NMOS 101 finished becoming on-state. The PMOS 104 remains on-state for a period during the period of the NMOS 102 being on-state.

The predetermined time Toff is provided for ensuring a period during the period of the NMOS 101, the NMOS 102, the PMOS 103, and the PMOS 104 being kept under off-state. During the period ii, the PMOS 104 is turned on after lapse of the predetermined time Toff. While in the duration iv, the PMOS 103 is turned on after lapse of the predetermined time Toff.

The states illustrated in FIGS. 7B and 7D show that the PMOSs 103, 104 kept under off-state during the period Toff achieved at the initial phase, and the electric current flows by way of the body diode. The PMOSs 103, 104 becomes on-state after the period Toff.

By turning on the PMOSs 103, 104 prior to the NMOSs 101, 102 being on-state, the period of the electric current flowing through the body diodes of the PMOSs 103, 104 can be made shortened, and the loss corresponding to the voltage drop Vf can be diminished.

Figure 8:
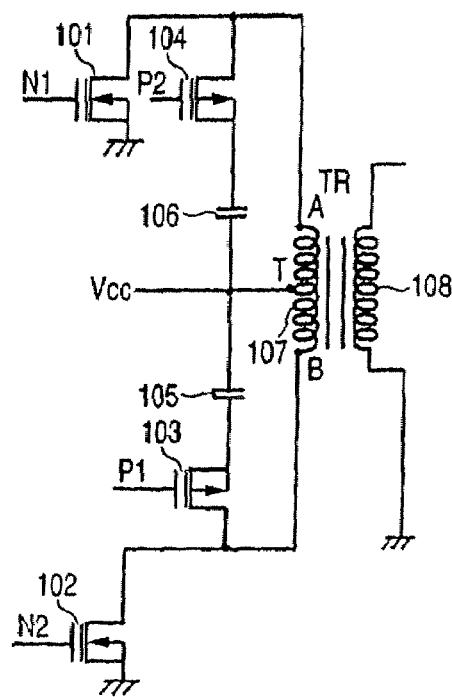
FIG. 8 is a view showing another example in which the main circuit configuration of the inverter shown in FIG. 1 has been changed.
Figure 9:
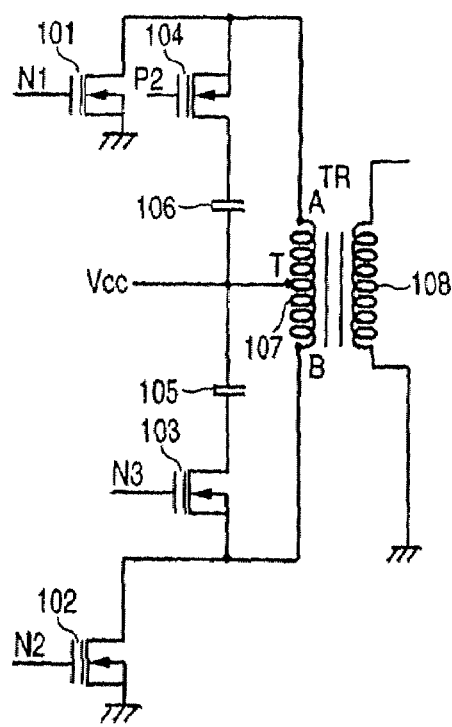
FIG. 9 is a view showing still another example in which the main circuit configuration of the inverter shown in FIG. 1 has been changed.

FIGS. 8 and 9 are diagrams showing another embodiment in which the configuration of the main circuit of the inverter shown in FIG. 1 is changed.

FIG. 8 shows a sequence of connection of the series circuit consisting of the PMOS 103 functioning as the third semiconductor switch and the first capacitor 105 and a sequence of connection of the series circuit consisting of the PMOS 104 functioning as the fourth semiconductor switch and the second capacitor 106, in the manner inverted to that shown in FIG. 1. Inverter operation is performed similarly by means of the main circuit configuration shown in FIG. 8.

FIG. 9 shows in that an NMOS is used for the third semiconductor switch 103 and the fourth semiconductor switch 104, both being shown in FIG. 8. By means of such a configuration, the first through fourth semiconductor switches 101 to 104 can be embodied all by the NMOSs. Hence, there can be constituted an inverter which is more advantageous in terms of cost and area. In association with the third and fourth semiconductor switches 103, 104 being embodied as NMOSs, the inverter control IC 200 supplies the gate drive signals N3, N4 to be used for appropriate control of the third and fourth semiconductor switches 103, 104 at the same timings as those shown in FIGS. 3 and 6.

Figure 10:
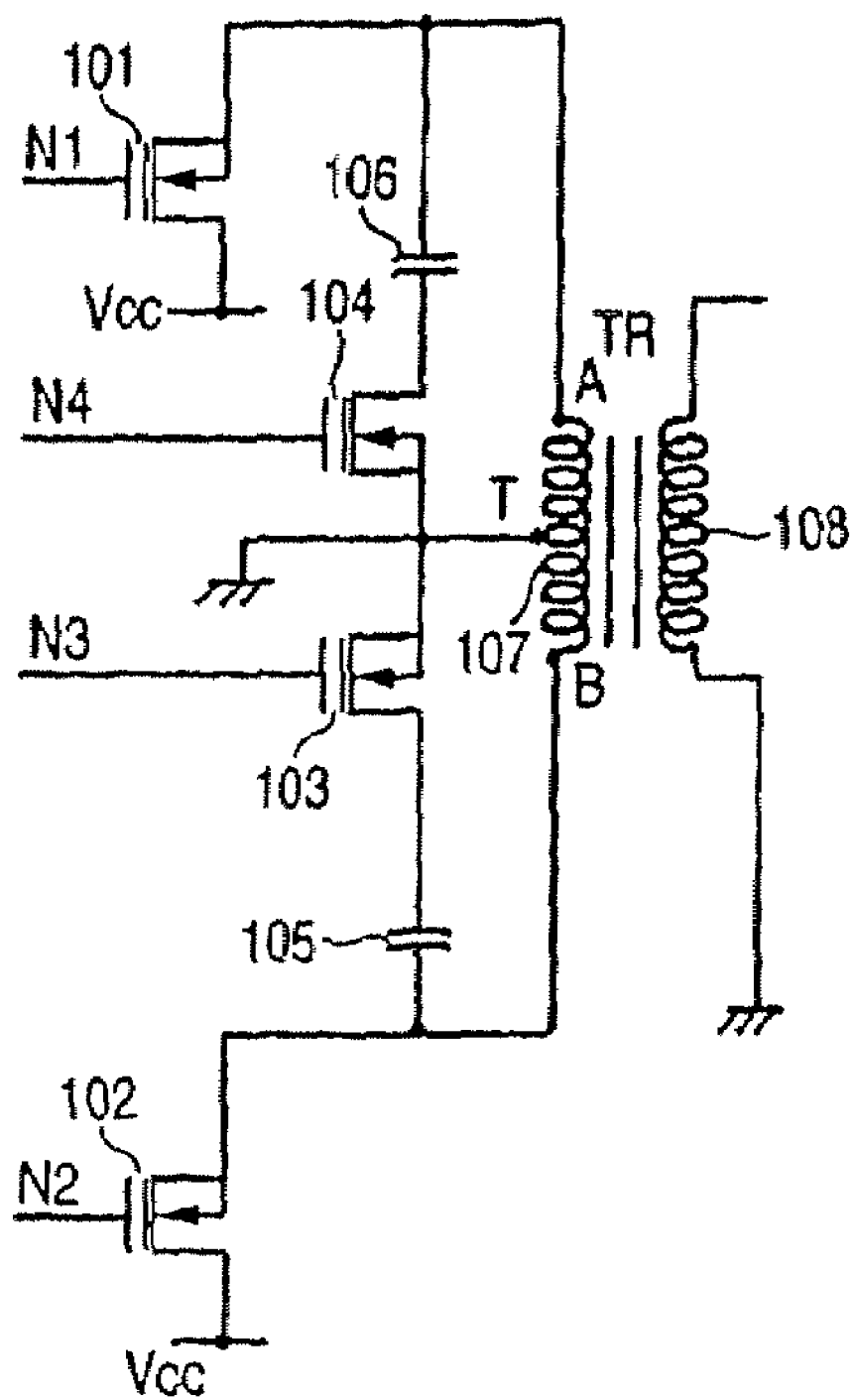
FIG. 10 is a view showing yet another example in which the main circuit configuration of the inverter shown in FIG. 1 has been changed.

FIG. 10 shows that the center tap T of the transformer TR is connected to the ground serving as a common potential point. The DC power supply voltage VCC supplied from the battery power source BAT is connected to the first terminal A by way of the NMOS 101 functioning as the first semiconductor switch, so as to form a current path in the first direction toward the primary winding 107 of the transformer TR. The DC power supply voltage VCC is connected to the second terminal B by way of the NMOS 102 functioning as the second semiconductor switch, thereby forming a current path in the second direction toward the primary winding 107 of the transformer TR.

A series circuit consisting of the first capacitor 105 and the NMOS 103 functioning as the third semiconductor switch is connected between the center tap T of the primary winding 107 and the second terminal B. Similarly, a series circuit consisting of the second capacitor 106 and the NMOS 104 serving as the fourth semiconductor switch is connected between the center tap T of the primary winding 107 and the first terminal A.

The first through fourth semiconductor switches 101 to 104 are turned on and off in the same manner as that of the semiconductor switches 101 through 104 shown in FIG. 1. In FIG. 10, the semiconductor switches 101, 102 can be embodied as PMOSs.

Even in the case shown in FIG. 10, supplied from the inverter control IC 200 are the gate drive signals N3, N4 to be used for appropriate control of the first through fourth semiconductor switches 101 to 104 at the same timings as those shown in FIGS. 3 and 6.

The foregoing descriptions have described use of MOS-FETs as the first through fourth semiconductor switches. The first through fourth semiconductor switches may be embodied by devices which can be turned on and off by means of a drive signal with body diodes. Alternatively, the switches may be provided with diodes having the same functions as those of the body diodes.

According to the invention, a transformer having a primary winding with a center tap to which a DC power supply voltage is supplied is used for an inverter which produces from a DC power source an AC voltage to be used for activating a load. First and second semiconductor switches to be activated alternately are provided between ends of the primary winding and a common potential point. An electric current flowing into load is fed back, there by subjecting semiconductor switches to pulse width modulation (PWM) control. Power supply to the load can be controlled elaborately with a simple configuration.

A series circuit consisting of a first capacitor and a third semiconductor switch and another series circuit consisting of a second capacitor and a fourth semiconductor switch are connected between the center tap of the primary winding and ends of the primary winding. The third and fourth semiconductor switches are activated in synchronism with the first and second semiconductor switches, thereby preventing occurrence of an anomalous high voltage, which would otherwise be caused at the time of switching. As a result, the inverter can be configured through use of a circuit element of low withstand voltage.

The semiconductor switch is embodied as a MOS transistor, so that operation of the body diode (i.e., a backgate diode) can be utilized effectively.

The third and fourth semiconductor switches are activated prior to activation of the first and second semiconductor switches. A period during which the electric current flows through the body diodes of the semiconductor switches is shortened, thereby diminishing a loss corresponding to the amount of voltage loss.

Burst control which enables adjustment of a ratio of an ON time to an OFF time is performed in conjunction with pulse width modulation control. Power supply to the load can be adjusted over a wide range in excess of the limit of the pulse width modulation control.

What is claimed is:

1. A DC-AC converter comprising:
a transformer having a primary winding with a center tap, and at least one secondary winding, in which the center tap is connected to a first potential point of a DC power source;
a first semiconductor switch which is connected between one end of the primary winding and a second potential point of the DC power source and causes an electric current to flow through the primary winding in a first direction;
a second semiconductor switch which is connected between the other end of the primary winding and the second potential point and causes an electric current to flow through the primary winding in a second direction;
a first capacitor and a third semiconductor switch, which are connected in series between the other end of the primary winding and the center tap;
a second capacitor and a fourth semiconductor switch, which are connected in series between the one end of the primary winding and the center tap;
a current detection circuit to be used for detecting an electric current which flows into a load connected to the secondary winding;
a logic circuit to be used for outputting a switch drive signal and which produces, on the basis of the electric current flowing through the load, a first switch drive signal to be used for turning on the first semiconductor switch, a second switch drive signal to be used for turning on the second semiconductor switch, a third switch drive signal to be used for turning on the third semiconductor switch, and a fourth switch drive signal to be used for turning on the fourth semiconductor switch; and a third capacitor which is connected to one end of the secondary winding, and a cold cathode fluorescent lamp which is connected to said one end of the secondary winding, wherein
the first through fourth switch drive signals are produced at timings of an off-state period where the first though fourth semiconductor switches are turned off, said timings being produced during interval periods such that a first semiconductor switch group, comprising the first semiconductor switch and the third semiconductor switch, and a second semiconductor switch group, comprising the second semiconductor switch and the fourth semiconductor switch, are alternately made on-state synchronously with triangular wave signals of the triangular wave signal train.

2. The DC-AC converter according to claim 1, wherein the first and third semiconductor switches are turned on at every other peak of the triangular wave signal of the triangular wave signal train and remain on-sate until an immediately-subsequent triangular wave signal becomes equal to the feedback signal; and further wherein the second and fourth semiconductor switches are turned on at every other peak of the triangular wave signal of the triangular wave signal train, which is different from that of being generated when the first and third semiconductor switches are turned on, and remain on-state until an immediately-subsequent triangular wave signal becomes equal to the feedback signal.

3. The DC-AC converter according to claim 1, wherein the first semiconductor switch is turned on at every other peak of the triangular wave signal of the triangular wave signal train and remains on-state until an immediately-subsequent triangular wave signal becomes equal to the feedback signal;

the second semiconductor switch is turned on at every other peak of the triangular wave signal of the triangular wave signal train, which is different from that of being generated when the first semiconductor switch is turned on, and remains on-state until an immediately-subsequent triangular wave signal becomes equal to the feedback signal;

the third semiconductor switch is turned on at a timing before the first semiconductor switch is turned on, but after lapse of a predetermined period of time since the second semiconductor switch completes the on-sate period thereof and remains on-state during a period in which the first semiconductor switch remains on-state; and the fourth semiconductor switch is turned-on at a timing before the second semiconductor switch is turned on, but after lapse of a predetermined period of time since the first semiconductor switch completes the on-state period thereof and remains on-state during a period in which the second semiconductor switch remains on-state.

4. The DC-AC converter according to claim 1, wherein the first through fourth semiconductor switches are MOS field-effect transistors.

5. The DC-AC converter according to claim 1, wherein a burst control signal in the form of a pulse train, which allows a ratio of on-state period and off-state period to be controlled, whereby the first through fourth switch drive signals can be produced or stopped.

* * * * *